(12) United States Patent
Roth et al.

(10) Patent No.: US 10,571,038 B2
(45) Date of Patent: Feb. 25, 2020

(54) BREAKAWAY COUPLING

(71) Applicants: OPW—Engineered Systems, Inc., Lebanon, OH (US); Operations Technology Development, NFP, Des Plaines, IL (US)

(72) Inventors: Joseph P Roth, Milford, OH (US); Michael Crum, Dayton, OH (US); Dennis R. Jarnecke, River Forest, IL (US); Krzysztof Wejdman, Zielonki (PL); Narendar Venkatachalapathy, Bangalor (IN)

(73) Assignees: OPW Engineered Systems, Inc., Lebanon, OH (US); Operations Technology Development, NFP, Des Plaines, IL (US)

( * ) Notice: Subject to any disclaimer, the term of this patent is extended or adjusted under 35 U.S.C. 154(b) by 0 days.

(21) Appl. No.: 16/037,839

(22) Filed: Jul. 17, 2018

(65) Prior Publication Data
US 2018/0328508 A1    Nov. 15, 2018

Related U.S. Application Data

(63) Continuation of application No. 15/139,126, filed on Apr. 26, 2016, now Pat. No. 10,054,237.
(Continued)

(30) Foreign Application Priority Data

May 15, 2015   (IN) .............................. 2464/CHE/2015

(51) Int. Cl.
*F16K 17/36* (2006.01)
*F16K 15/06* (2006.01)
(Continued)

(52) U.S. Cl.
CPC .............. *F16K 17/366* (2013.01); *E03B 7/00* (2013.01); *F16K 15/063* (2013.01);
(Continued)

(58) Field of Classification Search
CPC ........ F16K 17/366; F16K 15/063; E03B 7/00; F16L 55/1007; G01M 1/00; G01F 15/005
(Continued)

(56) References Cited

U.S. PATENT DOCUMENTS 2,048,388 A * 7/1936 Johnsen ............... F16L 55/1007
137/68.12
2,420,682 A * 5/1947 Powell .................... B25B 13/46
254/131
(Continued)

OTHER PUBLICATIONS

International Search Report and Written Opinion for PCT/US16/29598 dated Jul. 21, 2016.
(Continued)

*Primary Examiner* — Minh Q Le
(74) *Attorney, Agent, or Firm* — Workman Nydegger

(57) ABSTRACT

A breakaway coupling includes a body and a valve assembly inside the body. The body includes a fluid conduit and a shear groove between first and second portions. The shear groove is designed to crack, break, or separate under certain conditions. The valve assembly is designed to shut off fluid flow through the fluid conduit when the shear groove cracks, breaks, or separates. The valve assembly includes a valve seat, a sealing element, one or more pins, and a biasing member. The one or more pins hold the sealing element in an open position while the shear groove is in tack, and allow the sealing element to move to a closed position (with the help of the biasing member) in the event the shear groove cracks, breaks, or separates.

20 Claims, 10 Drawing Sheets

Related U.S. Application Data

(60) Provisional application No. 62/187,046, filed on Jun. 30, 2015.

(51) Int. Cl.
*F16L 55/10* (2006.01)
*E03B 7/00* (2006.01)
*G01M 1/00* (2006.01)
*G01F 15/00* (2006.01)

(52) U.S. Cl.
CPC ........... *F16L 55/1007* (2013.01); *G01M 1/00* (2013.01); *G01F 15/005* (2013.01)

(58) Field of Classification Search
USPC ...... 137/68.15, 68.14, 539, 540; 285/23, 24; 81/52, 54, 55, 437
See application file for complete search history.

(56) References Cited

U.S. PATENT DOCUMENTS

| | | | | |
|---|---|---|---|---|
| 2,906,280 | A * | 9/1959 | Mount | F16K 17/406 137/68.14 |
| 3,219,057 | A * | 11/1965 | Knowles | F16K 15/044 137/533.13 |
| 3,466,965 | A * | 9/1969 | McCarthy | F16B 21/10 411/21 |
| 3,630,214 | A * | 12/1971 | Levering | B64D 37/005 137/68.15 |
| 3,741,521 | A * | 6/1973 | Tatsuno | F16L 25/00 251/149.7 |
| 3,794,057 | A * | 2/1974 | Badger | F16K 17/36 137/68.15 |
| 3,845,538 | A * | 11/1974 | Demler, Sr. | B25B 27/16 29/234 |
| 3,995,694 | A * | 12/1976 | Freiburger | E21B 33/127 166/285 |
| 4,047,548 | A | 9/1977 | Wagner | |
| 4,091,839 | A * | 5/1978 | Donner | F16K 15/044 137/533.13 |
| 4,449,545 | A * | 5/1984 | Vernon | F16K 17/36 137/68.15 |
| 1,691,941 | A | 9/1987 | Rabushka | |
| 4,721,022 | A * | 1/1988 | Batten | B25B 13/54 81/56 |
| 4,827,977 | A | 5/1989 | Fink, Jr. | |
| 4,872,471 | A | 10/1989 | Schneider | |
| 4,886,087 | A * | 12/1989 | Kitchen | F16L 41/10 137/68.14 |
| 5,209,262 | A | 5/1993 | Carow | |
| D344,223 | S * | 2/1994 | Kubicek | D8/22 |
| 5,289,842 | A * | 3/1994 | Bravo | B67D 7/3209 137/356 |
| 5,537,727 | A * | 7/1996 | Mayer | B25B 27/10 29/237 |
| 5,758,682 | A * | 6/1998 | Cain | F16K 17/40 137/543.13 |
| 5,826,610 | A * | 10/1998 | Bodhaine | F16L 29/00 137/68.15 |
| 6,237,446 | B1 * | 5/2001 | Zhang | B25B 13/5016 81/120 |
| 6,244,288 | B1 * | 6/2001 | Pettesch | B60P 3/225 137/267 |
| 6,276,237 | B1 * | 8/2001 | Stacy | B25B 13/488 81/13 |
| 6,802,332 | B1 * | 10/2004 | Stuart | B67D 7/3218 137/493.3 |
| 8,307,544 | B2 * | 11/2012 | Natoli | H01R 43/0425 29/748 |
| 8,353,229 | B1 * | 1/2013 | Muhareb | B25B 13/08 81/55 |
| 9,551,330 | B2 * | 1/2017 | Drube | F17C 7/02 |
| 10,054,237 | B2 | 8/2018 | Roth et al. | |
| 2005/0022883 | A1 | 2/2005 | Adams et al. | |
| 2005/0072477 | A1 | 4/2005 | Speer et al. | |
| 2008/0099704 | A1 | 5/2008 | Lauber et al. | |
| 2008/0196766 | A1 * | 8/2008 | Gandy | F16K 17/403 137/68.14 |
| 2013/0125989 | A1 | 5/2013 | Clever et al. | |

OTHER PUBLICATIONS

U.S. Appl. No. 15/139,126, May 3, 2017, Office Action.
U.S. Appl. No. 15/139,126, Nov. 2, 2017, Final Office Action.
U.S. Appl. No. 15/139,126, Apr. 17, 2018, Notice of Allowance.

* cited by examiner

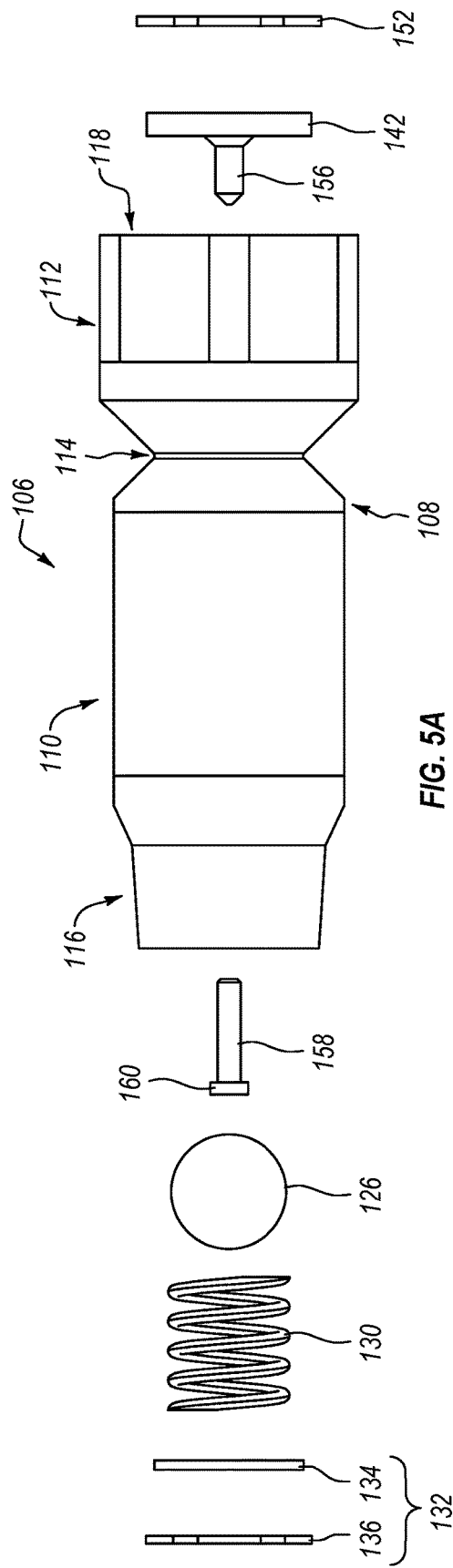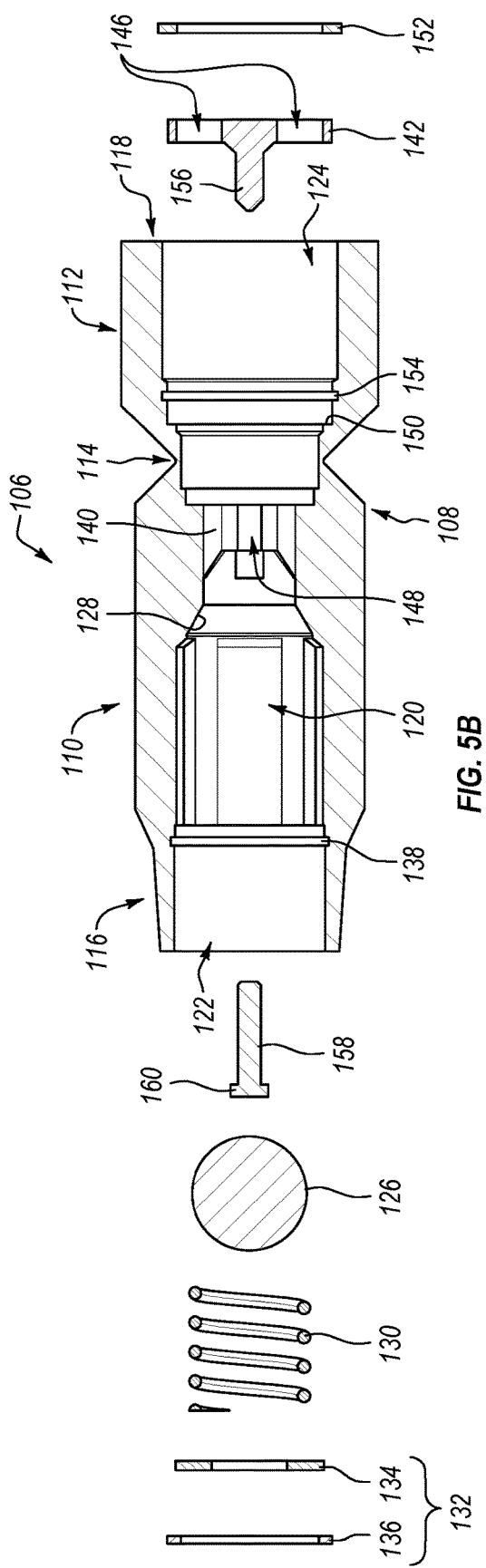
FIG. 5A
FIG. 5B

BREAKAWAY COUPLING

This application is a continuation of U.S. patent application Ser. No. 15/139,126, filed Apr. 26, 2016, which claims priority to and the benefit of U.S. Patent Application No. 62/187,046, filed Jun. 30, 2015, and entitled BREAKAWAY COUPLING, and Indian Patent Application No. 2464/CHE/2015, filed May 15, 2015, and entitled BREAKAWAY COUPLING, the entire content of each of which is incorporated herein by reference.

BACKGROUND

1. Technical Field

Exemplary embodiments of the present disclosure relate to fluid systems. More particularly, exemplary embodiments of the present disclosure relate to breakaway couplings that shut off fluid flow upon the occurrence of predefined conditions.

2. The Relevant Technology

In many fluid systems, fluids are transferred from one location to another via pipes or other conduits. Due to size, positioning, location, or the like, some portions of such fluid systems may be subject to impacts or other forces that can damage the fluid systems. For instance, a natural gas line may include a below-ground pipe, an above-ground meter (that tracks the amount of natural gas flowing through the line), and a connecting pipe that connect the meter to the below-ground pipe. Due at least in part to the size of the meter and the above-ground position of the meter and the connecting pipe, such connecting pipe and meter can be subject to impacts or other forces that can damage the connecting pipe or other portions of the system.

Depending on the location and type of fluid system involved, such damage can range from being a nuisance to being highly dangerous. For instance, if the fluid system is transporting pressurized air, damage to the system may result in the uncontrolled release of air into the surrounding environment, which is likely to be harmless in most situations. In the case of damage to a natural gas line, significant amounts of natural gas may be released into the surrounding environment before the leak is detected or shut off. The leaked natural gas may pose a serious danger to nearby humans, animals, structures, environment, and equipment, especially if the natural gas is exposed to a spark or flame.

Accordingly, what is desired is a breakaway coupling that can quickly and reliably shut off the flow of fluid to a damaged portion of a fluid system.

BRIEF SUMMARY

Exemplary embodiments of the present disclosure relate to a breakaway coupling that can quickly and reliable shut off the flow of fluid to a damaged portion of a fluid system. For example, in one embodiment, a breakaway coupling includes a body and a valve assembly inside the body. The body includes a fluid conduit and a shear groove between first and second portions. The shear groove is designed to crack, break, or separate under certain conditions. The valve assembly is designed to shut off fluid flow through the fluid conduit when the shear groove cracks, breaks, or separates. The valve assembly includes a valve seat, a sealing element, one or more pins, and a biasing member. The one or more pins hold the sealing element in an open position while the shear groove is in tack, and allow the sealing element to move to a closed position (with the help of the biasing member) in the event the shear groove cracks, breaks, or separates.

These and other objects and features of the present disclosure will become more fully apparent from the following description and appended claims, or may be learned by the practice of the disclosed embodiments as set forth hereinafter.

BRIEF DESCRIPTION OF THE DRAWINGS

To further clarify the above and other advantages and features of the present disclosure, a more particular description will be rendered by reference to specific embodiments thereof which are illustrated in the appended drawings. It is appreciated that these drawings depict only typical embodiments and are therefore not to be considered limiting of its scope, nor are the drawings necessarily drawn to scale. The disclosure will be described and explained with additional specificity and detail through the use of the accompanying drawings in which:

FIGS. 5A and 5B illustrate an exploded view and an exploded cross-sectional view of the exemplary breakaway coupling of FIG. 2;

DETAILED DESCRIPTION

The present disclosure relates to a breakaway coupling that is designed to preferentially fail under certain conditions and shut off fluid flow therethrough in the event of a preferential failure. According to one embodiment, a breakaway coupling includes a body and a valve assembly inside the body. The body includes a fluid conduit and a shear groove between first and second portions. The shear groove is designed to crack, break, or separate under certain conditions. The valve assembly is designed to shut off fluid flow through the fluid conduit when the shear groove cracks, breaks, or separates. The valve assembly includes a valve seat, a sealing element, one or more pins, and a biasing member. The one or more pins hold the sealing element in an open position while the shear groove is in tack, and allow the sealing element to move to a closed position (with the help of the biasing member) in the event the shear groove cracks, breaks, or separates.

Reference will now be made to the drawings to describe various aspects of exemplary embodiments of the disclosure. It is understood that the drawings are diagrammatic and schematic representations of such exemplary embodiments, and are not limiting of the present disclosure. While the drawings are not necessarily drawn to scale, the drawings may be to scale for some embodiments. No inference should therefore be drawn from the drawings as to the dimensions of any embodiment or element, unless indicated otherwise. In the following description, numerous specific details are set forth in order to provide a thorough understanding of the present disclosure. It will be obvious, however, to one of ordinary skill in the art that the present disclosure may be practiced without these specific details.

Figure 1A:
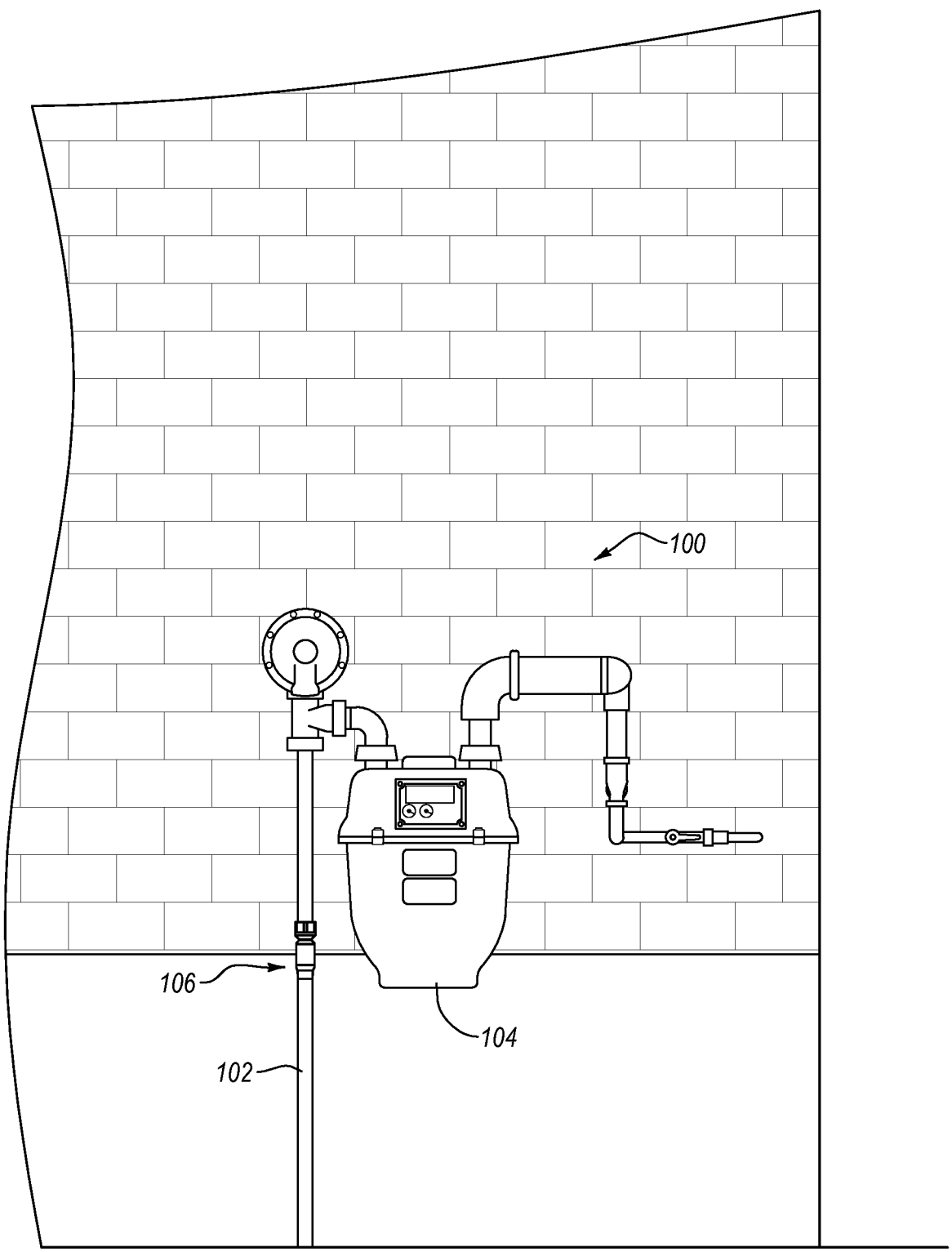
FIGS. 1A-1C depict a fluid system and the use of an exemplary breakaway coupling therein.
Figure 1B:
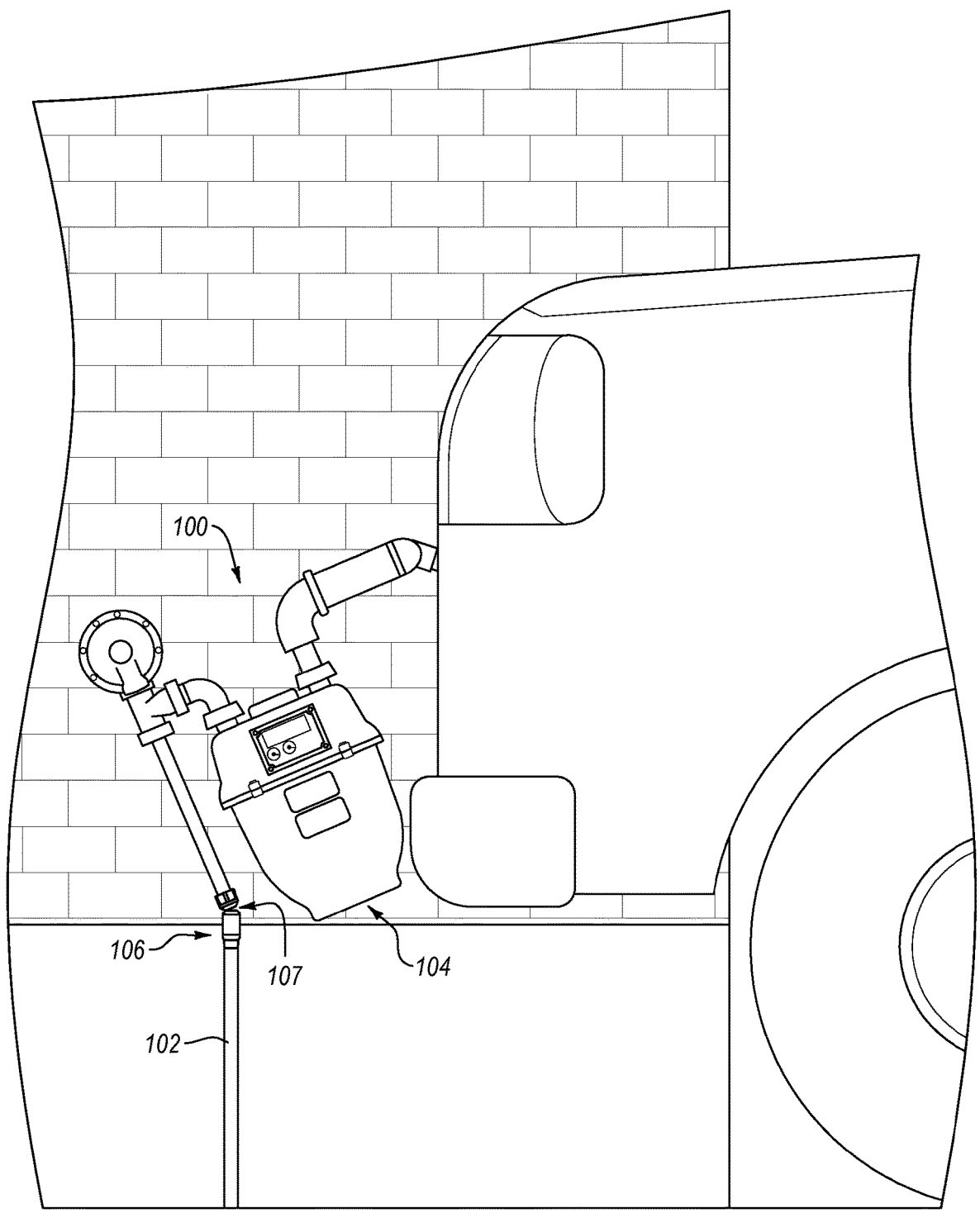
Figure 1C:
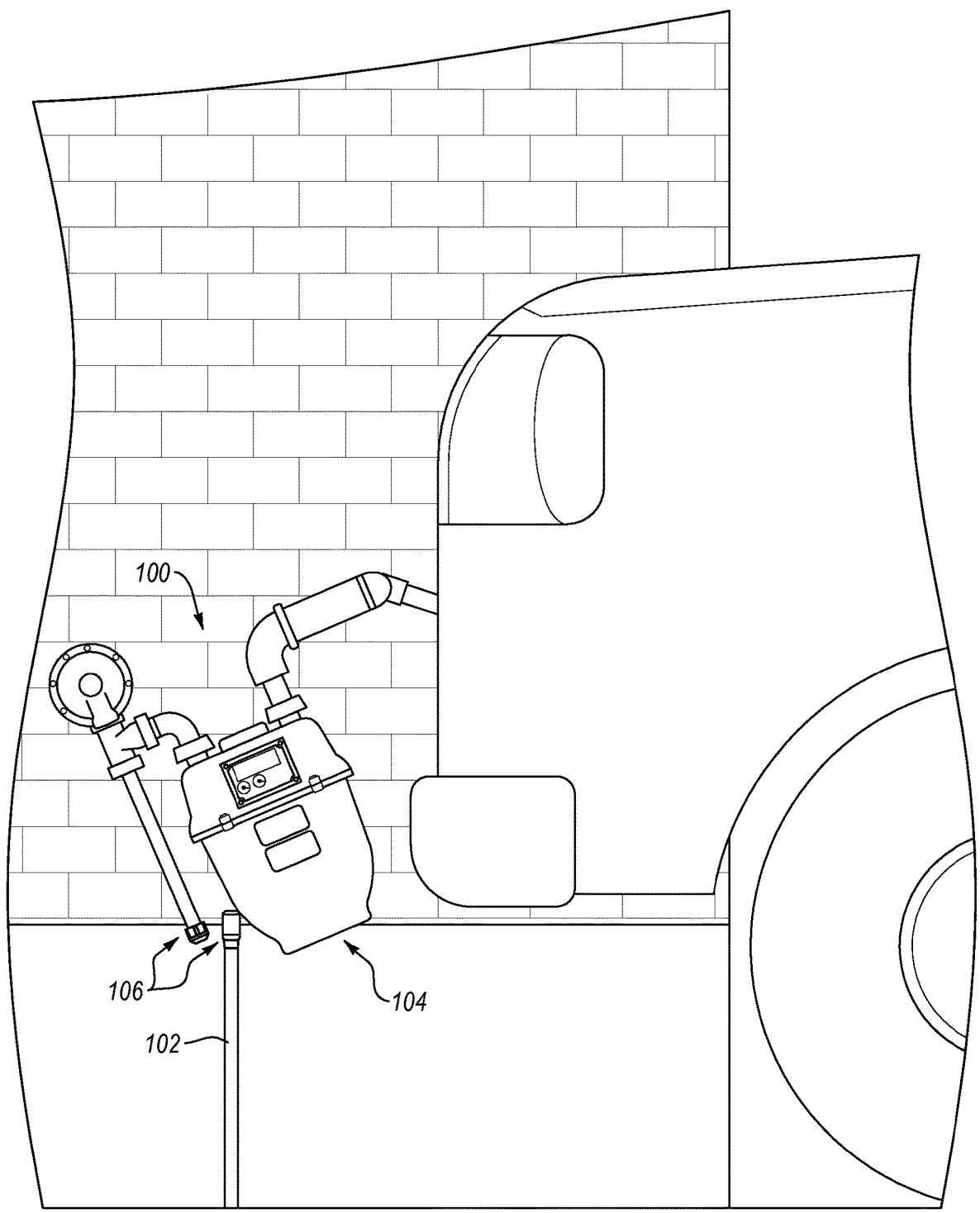
Figure 2:
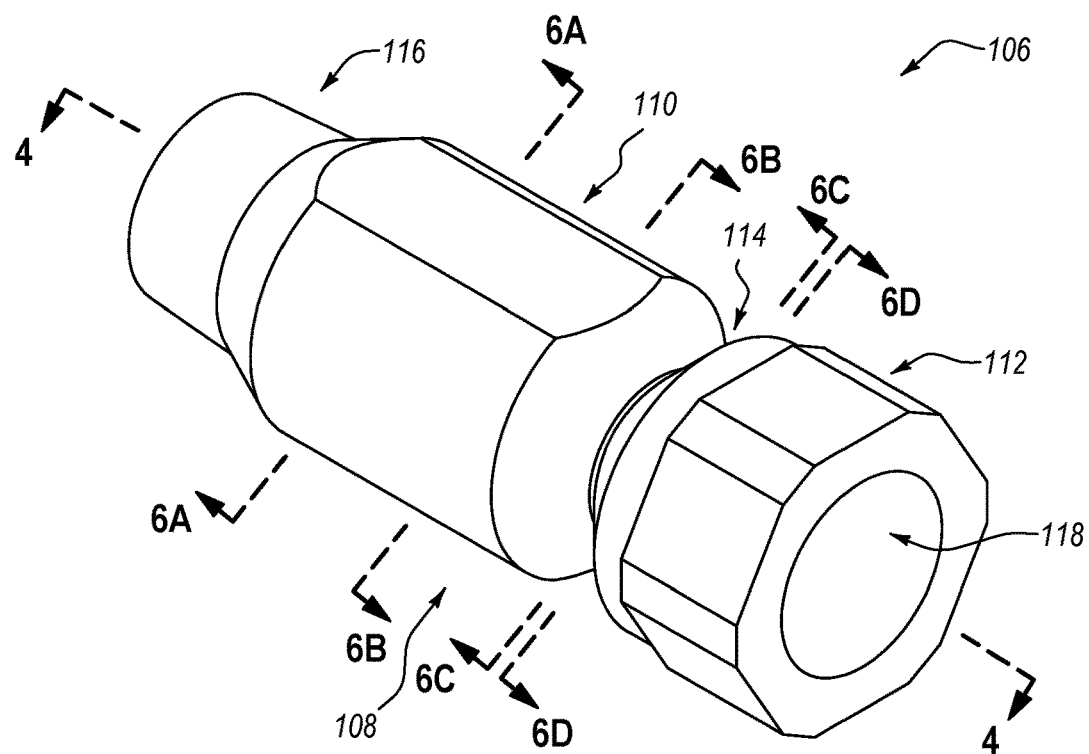
FIG. 2 illustrates a perspective view of an exemplary breakaway coupling according to the present disclosure.
Figure 3:
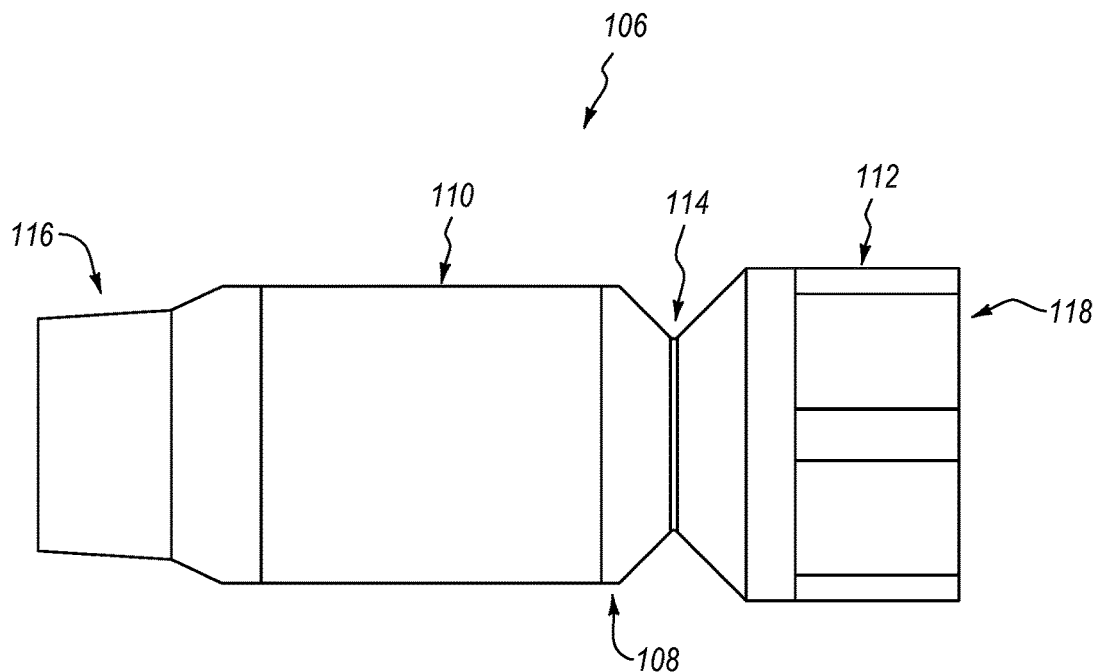
FIG. 3 illustrates a side elevational view of the exemplary breakaway coupling of FIG. 2.

With reference first to FIGS. 1A-1C, a portion of an exemplary embodiment of a fluid system is indicated generally at 100. As used herein, "fluid" is not limited to liquids, but can include a variety of other compositions. For example, the term "fluid," as used herein, may include liquids, gases, liquid-gas combinations, slurries, liquid-solid combinations, gas-solid combinations, and liquid-solid-gas combinations.

In the exemplary embodiment depicted in FIGS. 1A-1C, fluid system 100 is a natural gas conveying system. As can be seen in FIG. 1A, fluid system 100 includes a connection pipe 102 that is connected to a below-ground natural gas line (not shown). Fluid system 100 also includes a meter 104 that monitors that amount of natural gas that flows through the below-ground natural gas line. Connected between the connection pipe 102 and meter 104 is a breakaway coupling 106. Meter 104 is in fluid communication with the below-ground natural gas line via connection pipe 102 and breakaway coupling 106 to enable meter 104 to monitor the flow of natural gas through the below-ground natural gas line.

As noted elsewhere herein, a portion of a fluid system, such as meter 104, may be susceptible to forces that can cause damage to the fluid system. For instance, as shown in FIGS. 1B-1C, an automobile may collide with meter 104, thereby damaging fluid system 100. Other types of impacts or external forces may also cause damage to fluid system 100. By way of example, a lawnmower may impact a part of fluid system 100, thereby causing damage. Likewise, snow or ice falling from an adjacent building roof may also damage fluid system 100.

It will be appreciated that the components of fluid system 100 are merely exemplary. By way of example, breakaway coupling 106 may be employed in fluid system that does not include a meter. Rather, for instance, the meter 104 shown in FIGS. 1A-1C may be replaced with a different fluid system component, such as an outlet pipe.

The damage caused to fluid system 100 can vary. If an external object impacts fluid system 100, a portion of fluid system 100 may crack, break apart, or separate. For instance, as shown in FIG. 1B, fluid system 100 may be impacted by an automobile with sufficient force to create a crack 107 in a portion of fluid system 100. In other situations, such as shown in FIG. 1C, fluid system 100 may be impacted with sufficient force to break or cause a separation in fluid system 100. Under normal circumstances, such cracking or breaking may allow for the release of natural gas (or other fluid) from fluid system 100.

Breakaway coupling 106, however, is designed for preferential failure and to limit or prevent leakage of fluid from fluid system 100. More specifically, breakaway coupling 106 is designed to fail at a specific location and upon certain occurrences (e.g., impacts or other external forces on fluid system 100 above a predetermined threshold). The preferential failure feature of breakaway coupling 106 is intended to prevent other portions of fluid system 100 from failing (e.g., cracking, breaking) when fluid system 100 is exposed to external forces or impacts. Breakaway coupling 106 also includes a valve arrangement that shuts off the flow fluid in at least a portion of fluid system 100 (e.g., the preferential failure area of breakaway coupling 106) to limit or prevent leakage of fluid from fluid system 100.

With attention to FIGS. 2-6D, additional details regarding an example embodiment of breakaway coupling 106 will be provided. As best seen in FIGS. 2-5B, breakaway coupling 106 includes a body 108 that has a first portion 110, a second portion 112, and a shear groove 114 therebetween. As discussed in greater detail below, shear groove 114 is designed for preferential failure. That is, shear groove 114 is designed to predictably crack, break, or separate between first and second portions 110, 112 when fluid system 100 is exposed to external impacts or forces above a predetermined threshold.

Body 108 can be configured for connecting to other portions of fluid system 100. For instance, first portion 110 includes a connection portion 116 that can be connected to connection pipe 102 (FIG. 1A). Connection portion 116 may include threads to facilitate connection to connection pipe 102. In the illustrated embodiment, connection portion 116 is designed to have external threads, such that connection portion 116 is configured as a male member that can be threadably inserted into a female threaded connection portion on connection pipe 102. In other embodiments, connection portion 116 can have other connection features, such as internal threads to make connection portion 116 a female connection. In still other embodiments, connection portion 116 may be configured to be welded to another component, such as connection pipe 102.

Similar to first portion 110, second portion 112 includes a connection portion 118 that can be connected to meter 104 (FIG. 1A). Connection portion 118 may include threads to facilitate connection to meter 104. In the illustrated embodiment, connection portion 118 is designed to have internal threads, such that connection portion 118 is configured as a female member that can have threadably inserted therein a male threaded connection portion on meter 104. In other embodiments, connection portion 118 can have other connection features, such as external threads to make connection portion 118 a male connection. In still other embodiments, connection portion 118 may be configured to be welded to another component, such as a connection portion on meter 104.

Aspects of shear groove 114 are selected in a manner consistent with the intended use and operating conditions for breakaway coupling 106. As noted above, shear groove 114 is intended to predictably crack, break, or separate between first and second portions 110, 112 when fluid system 100 is exposed to external impacts or forces above a predetermined threshold. Accordingly, geometrical features of shear groove 114, such as the size, shape, and/or thickness of shear groove 114, may be determined with reference to such predetermined threshold.

Shear groove 114 is generally configured to remain materially unaffected by the normal system operating conditions to which it may be exposed. However, when fluid system 100 is exposed to external forces above a predetermined threshold, shear groove 114 will predictably crack, break, or separate between first and second portions 110, 112 (as shown in FIGS. 1B, 1C) to prevent other portions (e.g., connection pipe 102) from cracking or breaking.

Shear groove 114 may be formed in various ways to provide the preferential failures features of breakaway coupling 106. For instance, shear groove 114 may be formed as a machined groove around all or a portion of the circumference of body 108. Although the illustrated embodiment shows shear groove 114 as a groove machined into the external surface of body 108, shear groove 114 may be a groove machined into the internal surface of body 108.

Aspects of the groove geometry, such as the length, width and depth, may determine the force threshold at which shear groove 114 will crack, break or separate. Thus, for instance, as illustrated in FIGS. 4A and 5B, at least a portion of shear groove 114 may have a thickness (between internal and external surfaces) that is substantially less than the thickness of the rest or other portions of body 108.

In other embodiments, shear groove 114 may take a form other than a groove machined into body 108. For instance, shear groove 114 may take the form of a relatively thin ring or tube welded or brazed over, or onto, adjacent ends of first and second portions 110, 112. The relatively thin ring or tube may therefore connect first and second portions 110, 112 together under normal operating conditions and prior to exposure of fluid system 100 to external forces above a predetermined threshold. Upon exposure of fluid system 100 to external forces above the predetermined threshold, however, the relatively thin ring or tube may preferentially and predictably crack, break, or separate between first and second portions 110, 112. Any other arrangement of comparable functionality may alternatively be employed to form or create shear groove 114.

Figure 4A:
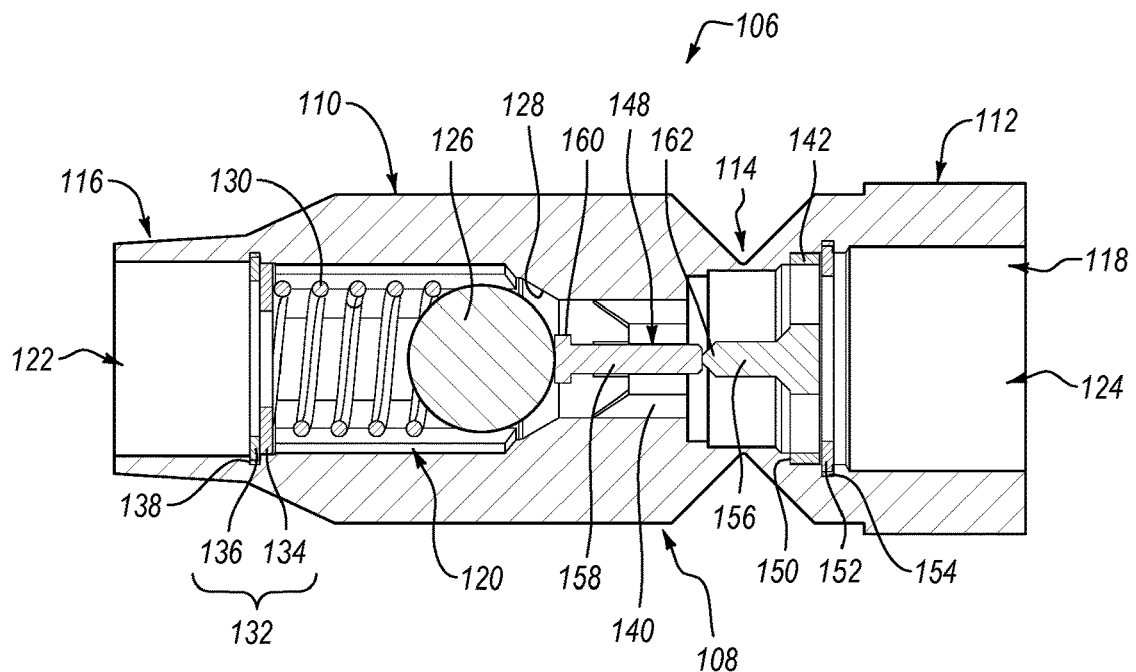
FIG. 4A is a cross-sectional view of the exemplary breakaway coupling of FIG. 2.

As can also be seen in FIGS. 4A and 5B, body 108 at least partially defines a fluid conduit 120 extending through breakaway coupling 106. Disposed at least partially within fluid conduit 120 is a valve assembly that is discussed in greater detail below. Under normal conditions, fluid enters fluid conduit 120 through an opening 122 in first portion 110. The fluid then flows through the portion of fluid conduit 120 within the first portion 110, then through the portion of fluid conduit 120 inside of shear groove 114, through the portion of fluid conduit 120 within second portion 112, and finally out of an opening 124 in second portion 112. The fluid conduit 120 and the components of the valve assembly can be designed for optimal or desired aerodynamic flow of fluid (e.g., to minimize or limit flow resistance) through breakaway coupling 106. For instance, the size, shape, orientation, and the like of the surfaces of the fluid conduit, flow channels, and valve assembly components can be selected to achieve a desired flow through breakaway coupling 106.

Under normal operating conditions, the valve assembly allows fluid to flow through fluid conduit 120, and thus through breakaway coupling 106. If, however, fluid system 100 (FIGS. 1A-1C) is exposed to external forces above a predetermined threshold and shear groove 114 cracks, breaks, or separates between first and second ends 110, 112, the valve assembly closes to limit or prevent fluid from flowing out of the cracked, broken, or separated shear groove 114.

In the illustrated embodiment, the valve assembly includes a sealing element 126 and a seat 128. Sealing element 126 can take a variety of forms. In the illustrated embodiment, for instance, sealing element 126 comprises a spherical member that can be formed of various materials, such as a nitrile rubber. In other embodiments, sealing element 126 may be formed in non-spherical shapes. By way of example, sealing element 126 may be formed in cylindrical, conical, oval, donut, or other shapes. In an example alternative embodiment, sealing element 126 can take the form of a plunger with a plunger face that sealingly engages seat 128. In any event, sealing element 126 can take substantially any form so long as it is able to sealingly engage seat 128.

In addition or as an alternative to the shape and material used to enable sealing element 126 to sealingly engage seat 128, one or more seals (e.g., O-rings) may be used in conjunction with sealing element 126 to create a sealing engagement between sealing element 126 and seat 128. For instance, an O-ring may be mounted on either seat 128 or on a plunger face of sealing element 126 so that when sealing element 126 moves toward seat 128, the O-ring creates a sealing engagement therebetween.

As with sealing element 126, seat 128 can take various forms. In the illustrated embodiment, seat 128 comprises a chamfered, beveled, or angled surface formed on the interior of body 108 and is configured to sealingly engage with sealing element 126.

Figure 4B:
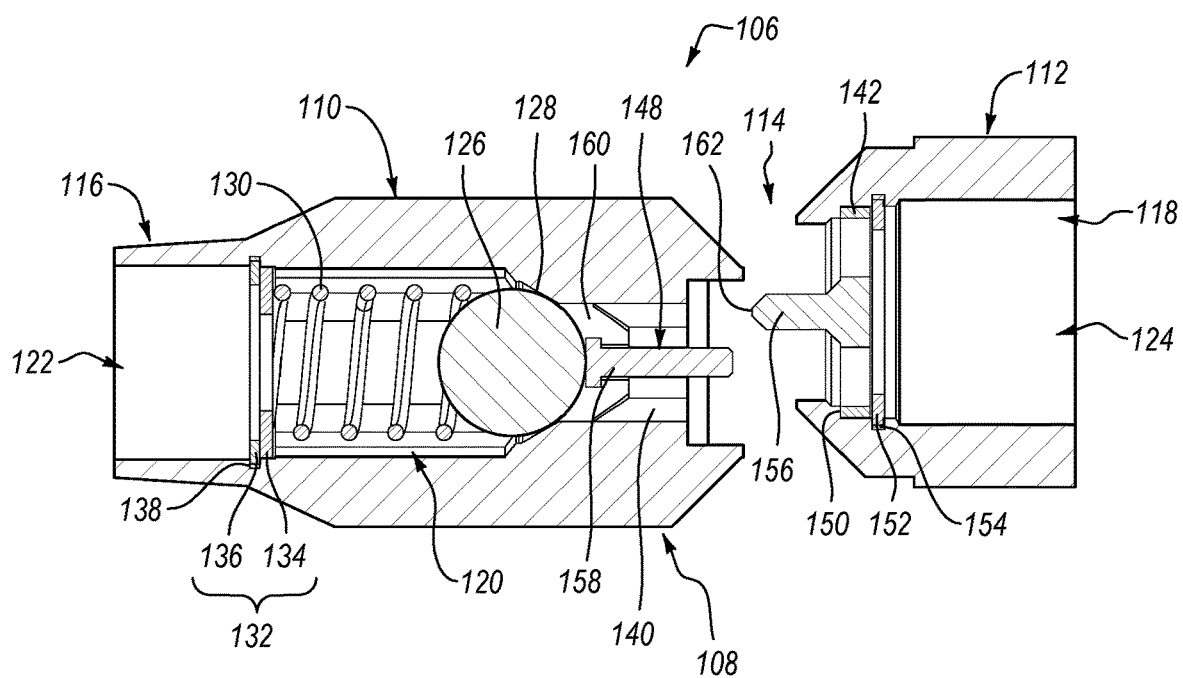
FIG. 4B is a cross-section view of the exemplary breakaway coupling of FIG. 2 after first and second portions have been separated.

Under normal operating conditions, sealing element 126 is spaced apart from seat 128 (FIG. 4A), thereby allowing fluid to flow therebetween. If shear groove 114 cracks, breaks, or separates between first and second ends 110, 112, sealing element 126 moves into sealing engagement with seat 128 to limit or prevent additional flow of fluid therebetween, as shown in FIG. 4B. As a result, the amount of fluid that is allowed to escape through the cracked, broken, or separated shear groove 114 is limited to, at most, the fluid that has already flowed between sealing element 126 and seat 128.

Sealing element 126 can be held in the open position (FIG. 4A) or allowed to move to the closed position (e.g., when sealing element 126 sealingly engages seat 128 as shown in FIG. 4B) in various ways. According to the illustrated embodiment, the valve assembly includes a biasing member 130 that biases or urges sealing element 126 toward seat 128 and the closed position. Biasing member 130 is illustrated as a compression spring, but can be any other suitable type of biasing mechanism.

Biasing member 130 is disposed within fluid conduit 120 and between sealing element 126 and a retention mechanism 132 so as to urge or bias sealing element 126 toward seat 128. Retention mechanism 132 can include a washer 134 that contacts biasing member 130 and a retention ring 136 that prevents axial movement of washer 134 and biasing member 130 in the direction of opening 122. Retention ring 136 can be received and held in a groove 138 formed in the interior surface of body 108. In other embodiments, retention mechanism 132 can take other forms, including soldier, adhesives, cement, clips, brackets, and the like.

As noted above, sealing element 126 can be held in an open position to allow fluid to flow through fluid conduit 120 prior to shear groove 114 cracking, breaking, or separating. Holding sealing element 120 in the open position can be accomplished by overcoming the biasing force of biasing member 130 with a bridge and pin arrangement as described below. The components of the bridge and pin arrangement can be considered part of the valve assembly.

In the illustrated embodiment, the bridge and pin arrangement includes a first bridge 140 in first portion 110 and a second bridge 142 in second portion 112. As illustrated in FIG. 6C, first bridge 140 has flow openings 144 to allow fluid to flow therethrough. Similarly, as shown in FIG. 6D, second bridge 142 has flow openings 146 to allow fluid to flow therethrough. The flow openings 144, 146 can be arranged in various patterns and have varying shapes. For instance, the flow openings 144, 146 can include four wedge shaped openings, as with flow openings 144 shown in FIG. 6C. Alternatively, the flow openings 144, 146 can be circular openings. The flow openings 144, 146 can include fewer or more than four openings. Likewise, the flow opening can have a wedge, circular, or any other suitable shape and can be arranged on first and second bridges 140, 142 in any suitable regular or irregular pattern.

According to the illustrated embodiment, first bridge 140 is integrally formed with body 108. For instance, body 108 may be formed of a solid material and the open portions therein may be machined out or otherwise formed therein, thereby leaving bridge 140 therein. The flow openings 144 and a pin opening 148 (described below) may be machined out of or otherwise formed in bridge 140. In other embodiments, first bridge 140 may be formed separately from body 108 and mounted therein, such as in the manner described below regarding second bridge 142.

Unlike bridge 140, bridge 142 is formed separately from body 108 and mounted therein. More specifically, according to the illustrated embodiment, bridge 142 is formed with a circular disk that is inserted into fluid conduit 120 through opening 124. Bridge 142 is mounted in a fixed axial position within second portion 112. In particular, bridge 142 is held in the fixed position between a shoulder 150 formed in the interior surface of body 108 and a retention ring 152. Retention ring 152 can be received and held in a groove 154 formed in the interior surface of body 108. In other embodiments, retention ring 144 can be replace or augmented with other retention mechanisms, such as soldier, adhesives, cement, clips, brackets, and the like. Shoulder 150 can prevent or limit axial movement of bridge 140 in the direction away from opening 124 and retention ring 144 can prevent or limit axial movement of bridge 140 in the direction toward opening 124. In other embodiments, bridge 142 may be integrally formed with body 108.

Second bridge 142 can also include or have connected thereto a bridge pin 156. As can be seen in FIGS. 4A-5B, bridge pin 156 extends towards sealing element 126. Bridge pin 156 is configured to interact with a pin 158 to hold sealing element 126 in the open position as shown in FIG. 4A. Pin 158 is slidably received within pin opening 148 in first bridge 140. Pin 158 includes a head 160 that engages or interacts with sealing element 126. In some embodiments, pin 158 and sealing element 126 may be connected or integrally formed.

As can be seen in FIG. 4A, when breakaway coupling 106 is assembled, bridge pin 156 and pin 158 are aligned with one another such that pin 158 is moved toward opening 122. Pin 158 engages with sealing element 126 such that movement of pin 156 towards opening 122 causes sealing element 126 to also move towards opening 122, thereby allowing fluid to flow through fluid conduit 120. As sealing element 126 moves towards opening 122, biasing member 130 is compressed, thereby storing potential energy.

When fluid system 100 is impacted or otherwise acted upon by an outside force sufficient to cause shear groove 114 to crack, break, or separate, pins 156, 158 move out of alignment with one another, as shown in FIG. 4B. When pins 156, 158 are not aligned with one another, the stored potential energy in biasing member 130 causes biasing member 130 to expand, which pushes sealing element 126 and pin 158 toward second portion 112. Movement of sealing element 126 toward second portion 112 causes sealing element 126 to engage seat 128, as shown in FIG. 4B. Biasing member 130 may act upon sealing element 126 with sufficient and continuous force to cause sealing element 126 to sealingly engage seat 128 to limit or prevent fluid from flowing thereby.

In the illustrated embodiment, bridge pin 156 includes a pointed or tapered tip 162 that interacts or engages pin 158. Although pin 158 is not illustrated with a P pointed or tapered tip, pin 158 could also or alternatively include such a tip. Including a pointed or tapered tip on one or both of pins 156, 158 can allow the valve assembly to be more responsive to impacts or external forces on fluid system 100. For instance, if fluid system 100 experiences an impact or external force that is strong enough to cause shear groove 114 to merely crack, but not break wide open or completely separate, the pointed or tapered tip 162 may still allow pins 156, 158 to move out of alignment with one another, thereby allowing sealing element 126 to move to the closed position.

Figure 6A:
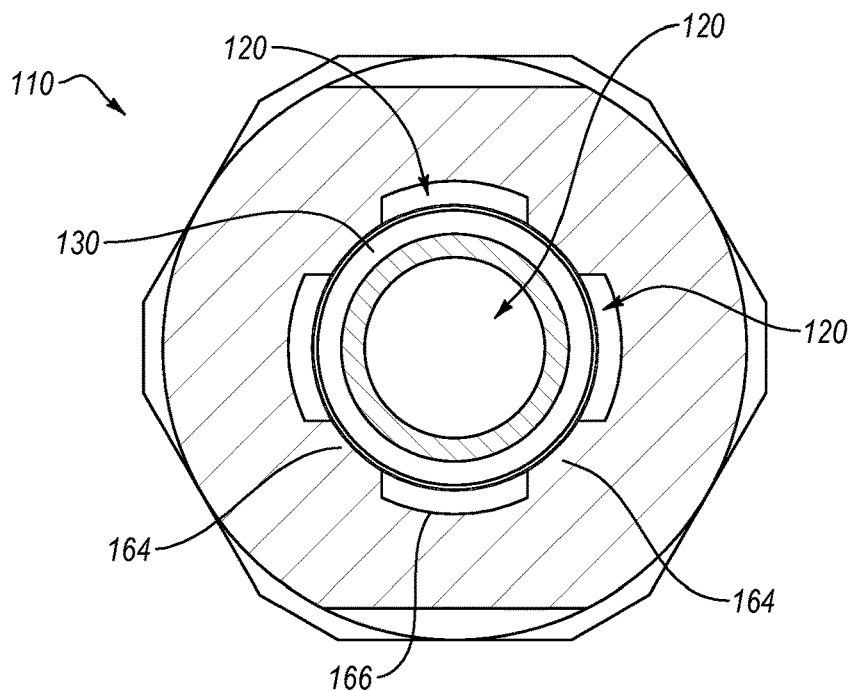
FIG. 6A illustrates a cross-sectional view of a first portion of the exemplary breakaway coupling of FIG. 2.
Figure 6B:
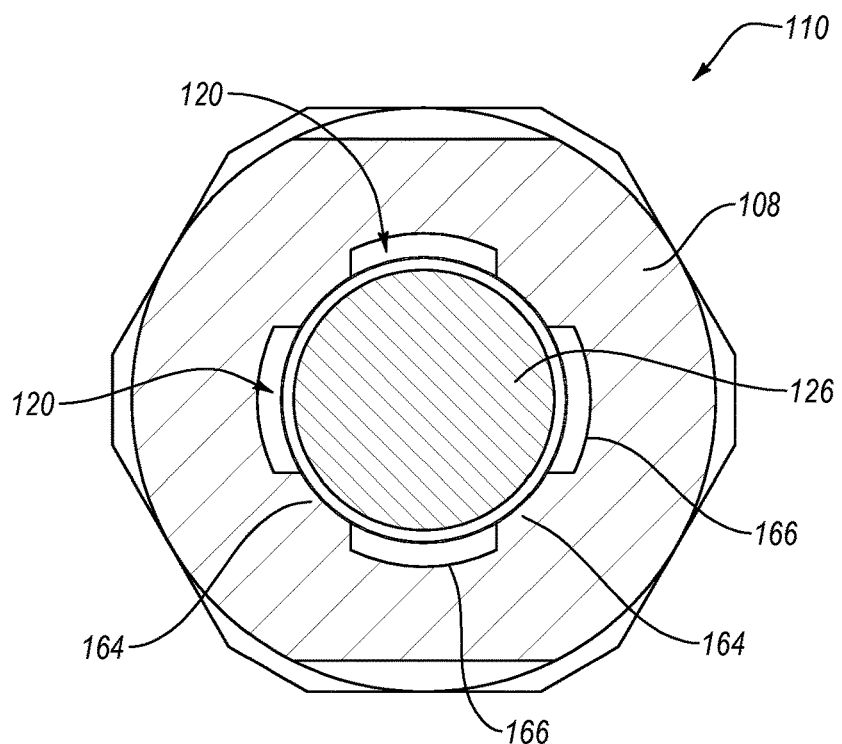
FIG. 6B illustrates another cross-sectional view of the first portion of the exemplary breakaway coupling of FIG. 2.
Figure 6C:
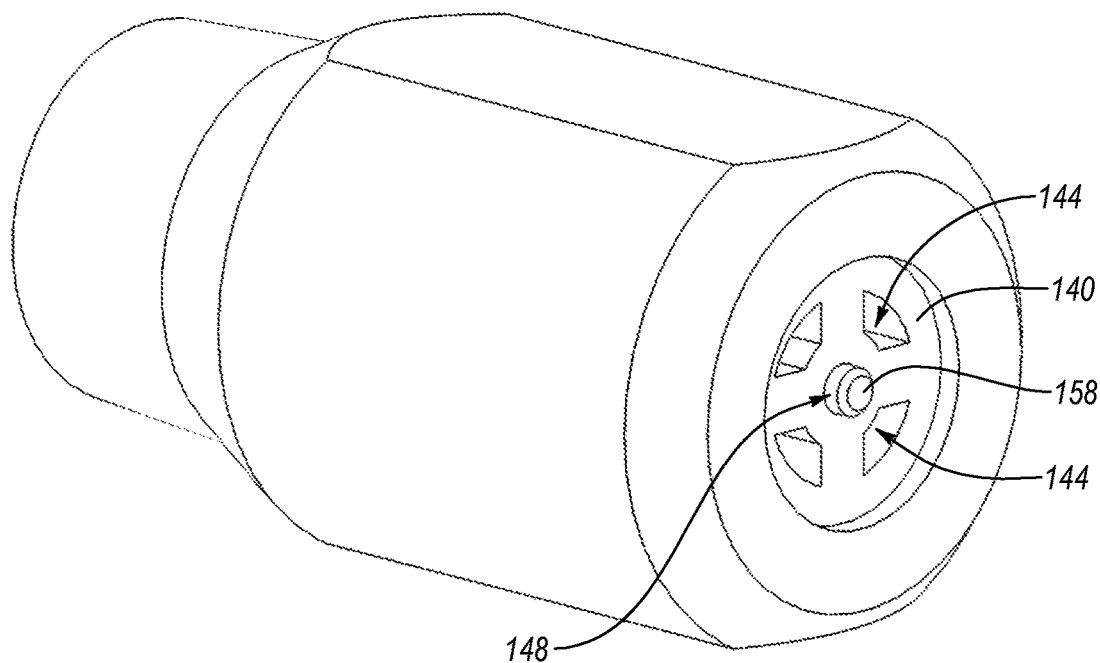
FIG. 6C illustrates a cross-sectional view of the exemplary breakaway coupling of FIG. 2 looking towards the first portion thereof.
Figure 6D:
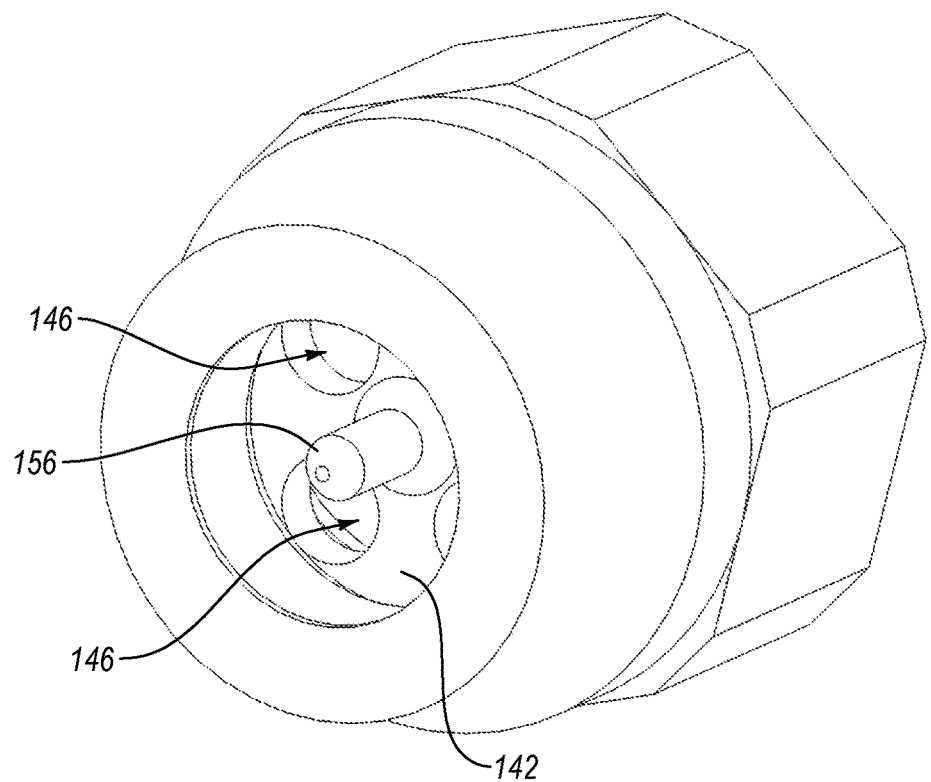
FIG. 6D illustrates a cross-sectional view of the exemplary breakaway coupling of FIG. 2 looking towards a second portion thereof.

Attention is now directed to FIGS. 6A and 6B, which illustrate two cross-sectional views of first portion 110 from an axial perspective. As can be seen, the interior surface of body 108 includes alternating ridges 164 and recesses 166. Ridges 164 act as guides for biasing member 130 and sealing element 126. More specifically, ridges 164 limit the amount of radial movement of biasing member 130 and sealing element 126 relative to a longitudinal axis of body 108, while still allowing and guiding biasing member 130 and sealing element 126 as they move axially.

It will be appreciated that the number and arrangement of ridges 164 may be modified as desired or needed. It will also be understood that guides may extend from biasing member 130 and/or sealing element 126 rather than or in addition to being formed on the interior surface of body 108. For instance, sealing element 126 may include guides extending therefrom that interact with the interior surface of body 108 to center sealing element 126 therein, while still allowing sealing element 126 to move axially through body 108.

Recesses 166 may be formed in the interior surface of body 108 and may form at least a portion of fluid conduit 120. For instance, fluid may flow through recesses 166 and around biasing member 130 and/or sealing element 126 (at least when sealing element 126 is in the open position).

Figure 7A:
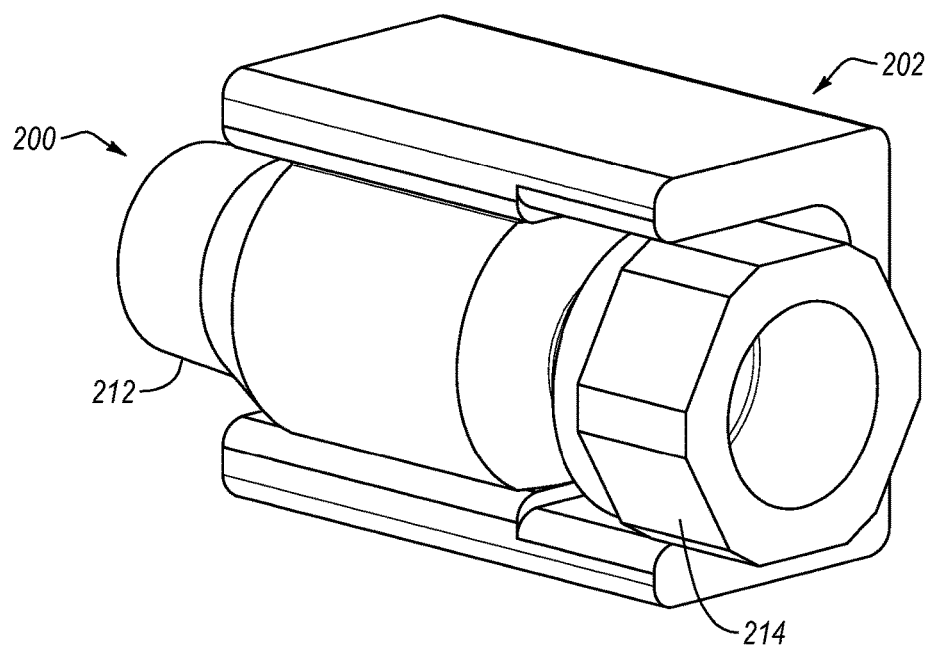
FIG. 7A-7B illustrate perspective views of another exemplary breakaway coupling and an installation tool according to another embodiment of the present disclosure.
Figure 7B:
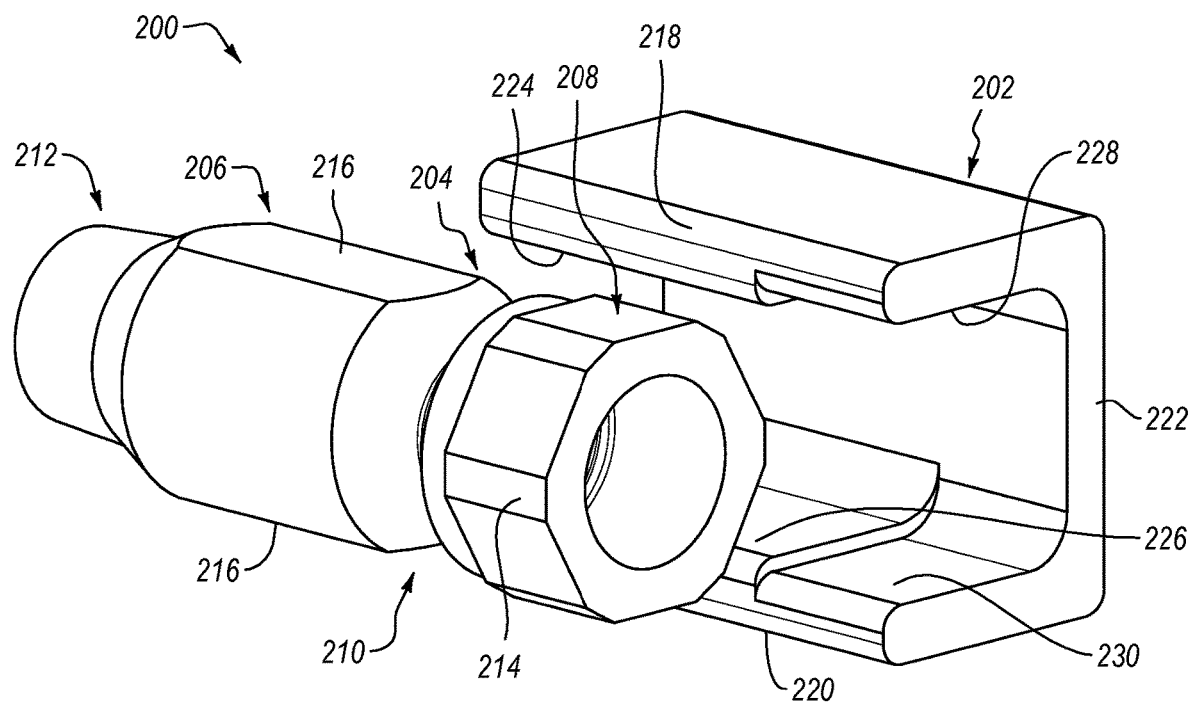
Figure 7C:
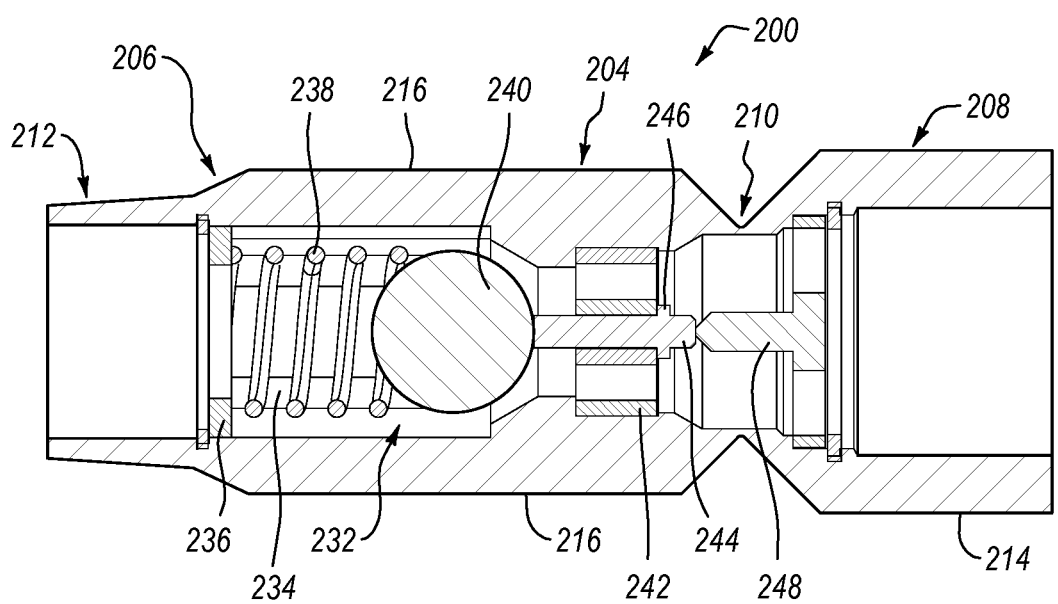
FIG. 7C illustrates a cross-sectional view of the exemplary breakaway coupling of FIGS. 7A-7B.

Attention is now directed to FIGS. 7A-7C, while illustrate another embodiment of a breakaway coupling 200 that is similar to breakaway coupling 106 as well as an installation tool 202 that can be used to install breakaway coupling 200. Breakaway coupling 200 can be similar or identical to breakaway coupling 106 in many respects. Accordingly, the following discussion will focus on the features of breakaway coupling 200 that are different than breakaway coupling 106. It will be appreciated, however, that the following features may be incorporated into breakaway coupling 106 and/or the features of breakaway coupling 106 may be incorporated into breakaway coupling 200.

As with breakaway coupling 106, breakaway coupling 200 includes a body 204 having a first portion 206, a second portion 208, and a shear groove 210 therebetween. The body 204 can include connection portions 212, 214 on opposing ends thereof to enable the body to be connected between components of a fluid system. The connection components 212, 214 may be female or male connection components.

As with shear groove 114, shear groove 210 is designed for preferential failure (e.g., predictably crack, break, or separate between first and second portions 206, 206) when fluid system is exposed to external impacts or forces above a predetermined threshold. Breakaway coupling 200 also includes a valve assembly therein that is similar or identical to the valve assembly in breakaway coupling 106 and which is designed to stop the flow of fluid through breakaway coupling 200 when shear groove 210 fails.

In the illustrated embodiment, body 204 may be formed (e.g., machined) from a bar stock that has a hexagonal cross-sectional shape. As a result, connection component 214 has a hexagonal outer cross-sectional shape. The hexagonal shape of connection component 214 can facilitate installation of breakaway coupling 200. For instance, the hexagonal shape enables an installation tool (such as tool 202 or a wrench) to securely hold and/or turn connection component 214 during installation.

First portion 206 may also include exterior surfaces that facilitate installation of breakaway coupling 200. In the illustrated embodiment, for instance, first portion 206 includes opposing flat surfaces 216. As with the hexagonal shape of connection component 214, the opposing flat surfaces 216 enables an installation tool (such as tool 202 or a wrench) to securely hold and/or turn connection component 214 during installation.

FIGS. 7A and 7B illustrate an example installation tool 202 that can be used to install breakaway coupling 200. As illustrated, installation tool 202 has a generally C-shaped cross-section with open ends and an open side. More specifically, tool 202 includes opposing legs 218, 220 connected together by a side wall 222. The open side of tool 202 is opposite to side wall 222 and allows tool 202 to receive breakaway coupling 200 therein. The open ends allow the ends of breakaway coupling 200 to extend out of tool 202 when breakaway coupling 200 is longer than tool 202.

In the illustrated embodiment, the interior surfaces of opposing legs 218, 220 are spaced apart a first distance along a first length of tool 202 and a second distance along a second length of tool 202. More specifically, opposing legs 218, 220 include interior surfaces 224, 226 that are spaced apart to allow first portion 206 of breakaway coupling 200 to be received therebetween. The distance between interior surfaces 224, 226 may correspond to the distance between opposing surfaces 216 so that tool 202 can grip first portion 206 during installation of breakaway coupling 200. Similarly, opposing legs 218, 220 include interior surfaces 228, 230 that are spaced apart to allow second portion 208 of breakaway coupling 200 to be received therein. The distance between interior surfaces 228, 230 may correspond to the distance between opposing surfaces of second portion 208 so that tool 202 can grip second portion 208 during installation of breakaway coupling 200.

Specific attention is now directed to FIG. 7C, which illustrates a cross-sectional view of breakaway coupling 200. Extending through breakaway coupling 200 is a fluid conduit 232. Disposed within fluid conduit 232 is a valve assembly that is substantially similar or to identical to the valve assembly in breakaway coupling 106. One notable distinction between breakaway couplings 106 and 200 is that breakaway coupling 200 includes guide ridges 234 that are formed separate from body 204. In the illustrated embodiment, guide ridges 234 are connected to retention ring 236. As with ridges 164, guide ridges 234 act as guides for biasing member 238 and sealing element 240. As with recesses 166, the area between guide ridges 234 forms at least a portion of fluid conduit 232, thereby allowing fluid to flow around biasing member 238 and sealing element 240.

Another distinction between breakaway couplings 106 and 200 is that the first bridge 242 of breakaway coupling 200 is formed separate from body 204, whereas the first bridge 140 of breakaway coupling 106 is integrally formed with body 108. In the illustrated embodiment, first bridge 242 can be inserted into fluid conduit 232 through the open end in second portion 208. First bridge 242 may be held in place with a retention ring, friction fit, welding, adhesive, or the like. First bridge 242 may also be held in place with pin 244. More specifically, pin 244 may have a retention ring 246 disposed thereon that presses and hold first bridge 242 in place within fluid conduit 232. Similar to breakaway coupling 106, breakaway coupling 200 includes a bridge pin 248 that urges the pin 244 towards the sealing element 240 to open fluid conduit 232. In addition to urging sealing element 240 to the open position, the interaction between pin 244 and bridge pin 248 also urges retention ring 246 of pin 244 against first bridge 242 to help maintain first bridge 242 in place.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A breakaway coupling kit, comprising:
   a breakaway coupling, comprising:
      a body having a first portion, a second portion, and a shear groove between the first and second portions, the first portion and the second portion each having opposing flat exterior surfaces along at least a portion of a length thereof, and the shear groove being configured to crack, break, or separate between the first and second portions upon the application of a force above a predetermined threshold; and
      a valve assembly disposed at least partially within the body and being configured to shut off fluid flow through the body when the shear groove cracks, breaks, or separates; and
   an installation tool comprising opposing legs connected together by a side wall, the opposing legs defining an open side of the installation tool opposite the side wall to enable insertion of the breakaway coupling into the installation tool, the opposing legs having interior surfaces that are spaced apart to correspond to a distance between the opposing flat exterior surfaces of the first and second portions of the body, the installation tool having a length sufficient to simultaneously engage the first and second portions of the body and span the shear groove.

2. The breakaway coupling kit as recited in claim 1, wherein the opposing flat exterior surfaces of the first portion are spaced apart by a first separation and the opposing flat exterior surfaces of the second portion are space apart by a second separation that is different than the first separation.

3. The breakaway coupling kit as recited in claim 2, wherein the interior surfaces of the opposing legs are spaced apart a first distance along a first length of the installation tool and a second distance along a second length of installation tool.

4. The breakaway coupling kit as recited in claim 3, wherein the first distance corresponds to the first separation and the second distance corresponds to the second separation.

5. The breakaway coupling kit as recited in claim 1, wherein the body comprises a fluid conduit extending through the first portion, the second portion, and the shear groove.

6. The breakaway coupling kit as recited in claim 5, wherein the valve assembly comprises:
a valve seat disposed within the fluid conduit in the first portion of the body; and
a sealing element movably disposed within the fluid conduit in the first portion, the sealing element being movable between an open position and a closed position relative to the valve seat, the open position allowing fluid to flow between the sealing element and the valve seat, the closed position preventing fluid from flowing between the sealing element and the valve seat.

7. A breakaway coupling kit as recited in claim 6, wherein the valve assembly further comprises a biasing member configured to move the sealing element from the open position to the closed position upon the application of the force above the predetermined threshold.

8. A breakaway coupling as kit recited in claim 7, further comprising a pin disposed at least partially within the second portion, the pin being configured to maintain the sealing element in the open position absent the occurrence of the application of the force above the predetermined threshold that would cause the shear groove to crack, break, or separate between the first and second portions.

9. A breakaway coupling as kit recited in claim 1, wherein the first portion and the second portion each comprise a connection portion configured to connect the breakaway coupling to a fluid system component.

10. A breakaway coupling kit as recited in claim 1, wherein the shear groove comprises a groove machined in an outer surface of the body between the first portion and the second portion.

11. A breakaway coupling kit, comprising:
a breakaway coupling, comprising:
a body having:
a first portion, a second portion, and a shear groove between the first and second portions, the shear groove being configured to crack, break, or separate between the first and second portions upon the occurrence of an impact above a predetermined threshold, and the first portion and the second portion each having opposing flat exterior surfaces along at least a portion of a length thereof; and
a fluid conduit extending through the first portion, the second portion, and the shear groove; and
a valve assembly disposed at least partially within the body and being configured to shut off fluid flow through the fluid conduit when the shear groove cracks, breaks, or separates, the valve assembly comprising:
a sealing element that is movable between an open position and a closed position, the open position allowing fluid to flow through the fluid conduit, the closed position preventing fluid from flowing through the fluid conduit;
a bridge fixedly disposed in the second portion of the body such that the bridge does not move relative to the second portion of the body before or after the shear groove cracks, breaks, or separates,
a bridge pin fixedly associated with the bridge in the second portion of the body such that the bridge pin does not move relative to the bridge, the bridge pin extending towards the first portion to push the sealing element to the open position absent the occurrence of an impact above the predetermined threshold that would cause the shear groove to crack, break, or separate between the first and second portions; and
an installation tool comprising opposing legs connected together by a side wall, the opposing legs defining an open side of the installation tool opposite the side wall to enable insertion of the breakaway coupling into the installation tool, the opposing legs having interior surfaces that are spaced apart to correspond to a distance between the opposing flat exterior surfaces of the first and second portions of the body, the installation tool having a length sufficient to simultaneously engage the first and second portions of the body and span the shear groove.

12. The breakaway coupling kit as recited in claim 11, further comprising a biasing member configured to move the sealing element from the open position to the closed position upon the occurrence of an impact above the predetermined threshold.

13. The breakaway coupling kit as recited in claim 11, wherein the first portion and the second portion are integrally formed as from a single component.

14. The breakaway coupling kit as recited in claim 13, wherein the shear groove comprises a groove machined in an outer surface of the body.

15. The breakaway coupling kit as recited in claim 11, wherein the shear groove comprises a ring or tube connecting the first portion and the second portion, the ring or tube having a thickness substantially less than a wall thickness of the first portion or the second portion.

16. A breakaway coupling kit, comprising:
a breakaway coupling comprising a body having a first portion, a second portion, and a shear groove between the first and second portions; and
an installation tool, comprising:
a side wall extending along a length of the tool;
a first leg extending from the side wall along the length of the tool, the first leg having at least one interior surface;
a second leg extending from the side wall along the length of the tool, the first leg having at least one interior surface, the second leg being positioned opposite the first leg such that the at least one interior surface of the second leg faces the at least one interior surface of the first leg; and
an open side opposite the side wall to enable the breakaway coupled to be at least partially inserted between the first and second legs,
the installation tool having a length sufficient to simultaneously engage the first and second portions of the body and span the shear groove.

17. The breakaway coupling kit as recited in claim 16, wherein the first leg and the second leg cooperate to define an open side of the installation tool opposite the side wall, the open side extending along the length of the tool to enable insertion of a breakaway coupling into the tool between the first leg and the second leg.

18. The breakaway coupling kit as recited in claim 16, wherein the at least one interior surface of the first leg comprises a first interior surface along a first length of the installation tool and a second interior surface along a second length of the installation tool.

19. The breakaway coupling kit as recited in claim 18, wherein the at least one interior surface of the second leg comprises a first interior surface along the first length of the installation tool and a second interior surface along the second length of the installation tool.

20. The breakaway coupling kit as recited in claim 19, wherein:

the first interior surface of the first leg and the first interior surface of the second leg are disposed opposite to one another and are spaced apart a first distance;

the second interior surface of the first leg and the second interior surface of the second leg are disposed opposite to one another and are spaced apart a second distance, the second distance being different than the first distance.

* * * * *